Dec. 31, 1946.                H. C. VIZENTS                2,413,532
                         CUTTER FORMING DEVICE
                         Filed June 20, 1942            2 Sheets-Sheet 1

Inventor:
Herman C. Vizents
By: Milo B. Stevens & Co.
        Attys.

Dec. 31, 1946.   H. C. VIZENTS   2,413,532
CUTTER FORMING DEVICE
Filed June 20, 1942   2 Sheets-Sheet 2
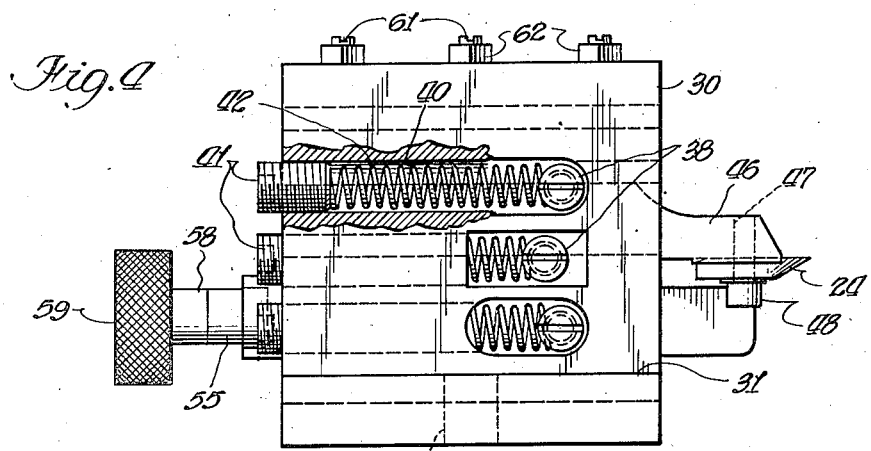
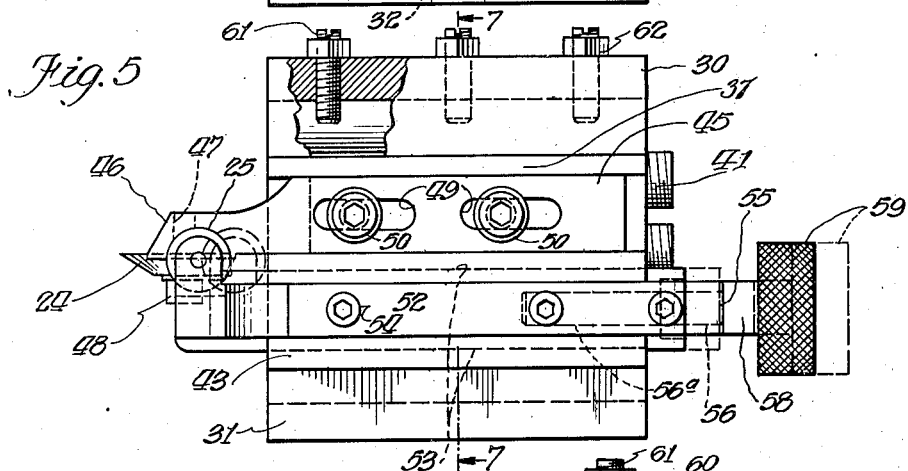
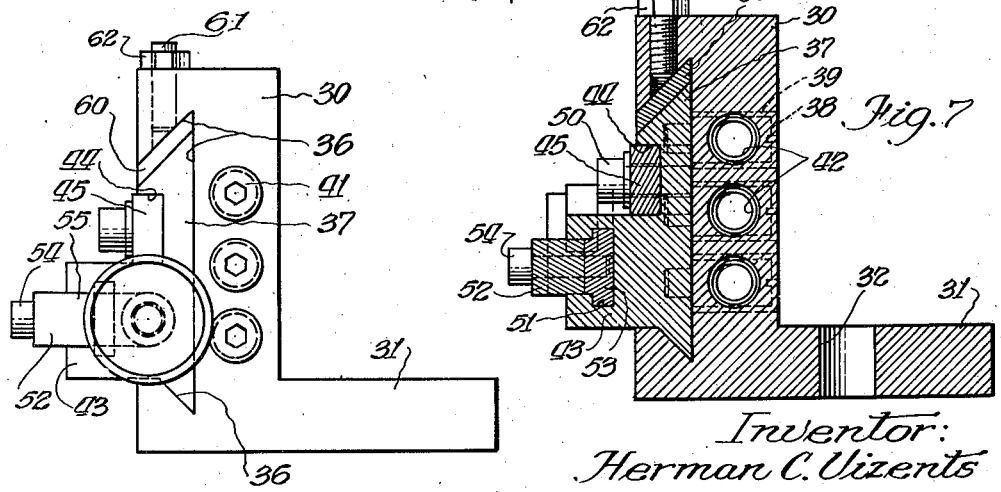
Inventor:
Herman C. Vizents
By: Milo B. Stevens & Co.
Atty's.

Patented Dec. 31, 1946

2,413,532

UNITED STATES PATENT OFFICE 2,413,532

CUTTER FORMING DEVICE

Herman C. Vizents, Chicago, Ill.; Lillian Vizents, administratrix of said Herman C. Vizents, deceased, assignor to Edwin H. Sigman, Chicago, Ill.

Application June 20, 1942, Serial No. 447,831

1 Claim. (Cl. 82—19)

My invention relates to machines for making cutters employed in milling machines, and its main object is to provide a small device in the nature of a lathe accessory or tool which may be used with facility to fashion the teeth of the cutter.

A further object of the invention is to provide a device of the above character which may be produced at an expense trifling in comparison with the cost of machines now employed for the same purpose.

Another object of the invention is to design the forming device with simple and efficient means for adjusting it to the requirements of the forming operation.

An important object of the invention is to provide a device which enables milling machine cutters to be produced quickly and at a fraction of the usual cost.

With the above objects in view, and any others which may suggest themselves from the description to follow, a better understanding of the invention may be had by reference to the accompanying drawings, in which—

Figs. 4 and 5 are elevations of the device from the right-hand and left-hand sides of Fig. 1, respectively;

Fig. 6 is a rear-end view; and

Fig. 7 is a section on the line 7—7 of Fig. 5.

Figure 1:
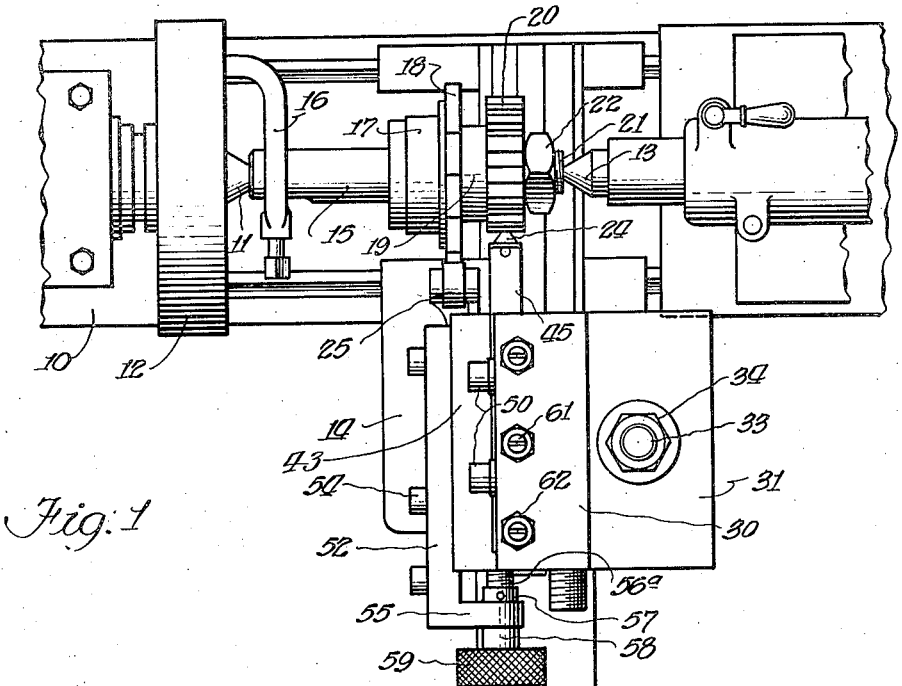
Figure 1 is a top plan view of the novel forming device as mounted on a lathe and about to engage the cutter periphery.

The preliminary formation of a milling cutter with a series of peripheral teeth is a routine operation, and cutters so made can be produced in any shop equipped with a milling machine. The completion of the cutter, however, is a more peculiar or difficult operation, since it involves the cutting or fashioning of the teeth with a particular profile bevel to impart a cutting edge and departing clearance to each tooth. Elaborate machines are now employed for fashioning the teeth as mentioned, making the process so involved that the cutter becomes a costly article to produce. Moreover, where the machines are engaged in important contract or production work, they cannot be spared for the temporary task of finishing one or more milling cutters, and the problem of procuring these is therefore aggravated. I have therefore recognized the need for a device for the single purpose of finishing milling cutters expeditiously, and of a character to be handy and easily applied to any lathe wherever the particular job is to be done.

In accordance with the foregoing, 10 denotes the bed of a conventional lathe, 11 the live center, 12 the drive chuck, 13 the dead center, and 14 the compound rest. The milling cutter to be finished requires the mounting of an arbor 15 between the centers 11 and 13, one end of the arbor receiving a dog 16 from the drive chuck 12. The medial portion of the arbor is built up with a collar 17 as a backing for a disc 18. The latter is followed by a spacer ring 19 and the milling cutter 20. The corresponding end portion of the arbor is threaded at 21 to receive a nut 22, by means of which the disc 10 and cutter 20 are made fast to the arbor.

Figures 2, 3:
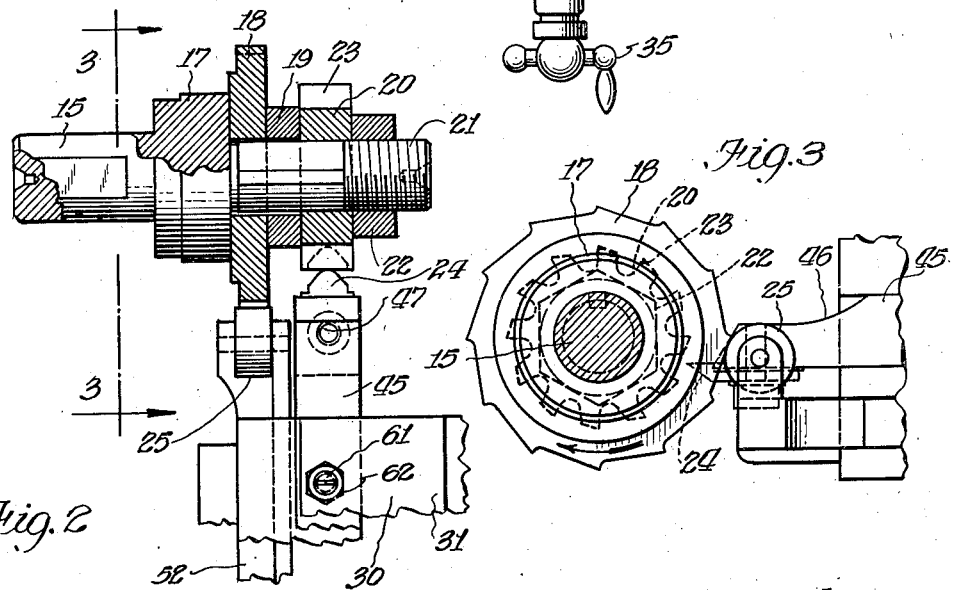
Figure 2 is a duplication of the central portion of Fig. 1 on an enlarged scale and partly in section.
Fig. 3 is a section on the line 3—3 of Fig. 2.

Dotted lines in Fig. 3 show the form of the finished cutter 20. However, when the cutter is first mounted in the arbor assembly just described, its periphery is circular and the teeth 23 do not have the bevel indicated in Fig. 3. In order that a tool may be applied to impart the required bevel to each tooth, it is necessary first to determine the angle of the bevel, and next to maintain it in respect to each tooth as the tool assumes the cut.

Accordingly, the disc 18 is divided peripherally into as many sections as the teeth of the cutter; and each section is beveled in ratchet form at the angle required for the tooth profile. The carrier of the tool 24 is then provided with a follower 25—preferably in the form of a roller— which governs the course of the tool in respect to each cutter tooth in harmony with the pattern disc 18, imparting the beveled or undercut profile to each tooth as the cutter rotates against the tool, that is, in the direction of the arrow in Fig. 3.

The device which carries the tool 24 and roller 25 is basically in the form of a sturdy angle plate 30 whose base 31 is perforated at 32 to receive a screw post 33 of the compound rest and be secured by means of a top nut 34. The plate 30 is thus adjustable in relation to the work in the lathe by means of the cross-feed control 35 of the same.

On the side opposite from the base 31, the angle plate 30 is formed with a horizontal dove-tail slot 36 to seat a similarly-formed slide 37. The slide has a vertical series of screw studs 38 projecting from one side into correspondingly-located slots 39 made in the angle plate. The slots open into horizontal bores 40 made in the angle plate from the rear, the entrances to the bores being tapped to receive socket screws 41. Compression springs 42 are lodged in the bores 40 between the respective screws 41 and screw-studs 38, maintaining the latter at the front ends of the slots 39. The slide 37 may thus be backed against the tension of the spring 42, such tension being variable by the adjustment of the rear screws 41. It is of course possible to use one large spring in place of the three small ones shown, but such an alternative would require extra lateral space and would not permit the uniform and flexible adjustment possible with the three springs shown.

The slide 37 is extended with a side wing 43 defining an upper horizontal channel 44. A bar 45 seats in the latter and is reduced at its front end with a tip 46 vertically tapped at 47. The tool 24 underlies the tip 46 and is made fast to the same by a screw 48 directed through the tool into the tapped bore 47 from below. The bar 45 is also made with a pair of longitudinally-spaced slots 49 for the entrance of socket-type set-screws 50. These thread into the slide 37 and fix forward and rearward adjustments of the bar relative to the same.

The outer edge of the wing 43 is formed with a horizontal T-slot 51 to seat a slide bar 52. For convenience of assembly, the latter is made with a separate head 53. Socket screws 54 are directed into the slide bar 52 from the side to thread into the head 53 to tightly secure the same to the slide bar. The forward end of the latter carries the follower roller 25, while the rear end is formed with an inward arm 55 in which a spindle 56 is journaled, the latter receiving collars 57 and 58 adjoining the arm 55 and hand knob 59 at the rear. The forward portion of the spindle is in the form of a screw 56a which threads into the rear end of the slide 37. Thus, the slide bar 52 is not fastened, but may be moved forth and back relative to the slide 37 when the hand knob 59 is rotated in the corresponding direction.

In order that the fit of the slide bar may always be close despite wear, it is spaced from the top of its cavity by a gib 60. A series of set screws 61 are directed downwardly through the stock of the angle plate 30 to bear on the gib and receive such adjustment as will lend the jib proper bearing contact with the slide, the adjustment of the screws being fixed by the application of locking nuts 62.

In order that the cutter assembly in the lathe may be ready for the forming tool 24, it is essential that the teeth or falls of the ratchet disc 18 should be in registration with the spaces between the cutter teeth 23. When this has been ascertained, the nut 22 is turned tight and the cutter assembly treated as a unit. It may now be assumed that the lateral spacing of the disc 18 and cutter 20 has been made the same as that of the follower roller 25 and the tool 24.

The forming device may now be moved in line with the work by the proper control of the compound rest and advanced until the roller 25 seats in the bottom of the nearest ratchet fall of the disc 18. The advance of the roller—by means of the hand knob 59—now causes the slide 37 to back against the tension of the springs 42, so that the roller is held with a corresponding amount of pressure against the periphery of the disc. The tool may now be adjusted to the work, and the latter put in motion. The cross-feed control 35 can now be used to advance the tool, but it will be apparent that the course of the same will be controlled by the profile of the cam disc 18. In other words, the tool will be backed each time the roller 25 climbs a disc tooth, to make a receding cut in the cutter tooth it negotiates, whereby to impart the required longitudinal slant to its profile. While the resistance of the springs 42 will increase as the tool advances, there should be no hardship in this respect, as the entire travel of the tool is usually not over an eighth of an inch, and the springs are amply long to absorb the pressure without imposing strain on the tool or parts of the device. However, this situation can be relieved where advisable, or in certain instances, by backing the screws 41 to reduce the pressure on the springs 42 as circumstances dictate.

It will be evident from the above description that the novel cutter forming device is a unit which eliminates the need of an entire or elaborate machine for the immediate operation of forming the cutter profile. The device is purely an accessory, takes up little room on the lathe, and can be taken off and put away in a small drawer as soon as its task has been performed. On the other hand, its compactness and simplicity do not place the device in the class of a makeshift or gadget, as it is solidly and accurately constructed, and is a machine in every sense of the word. However, due to its small size and few parts the device can be produced to sell at modest cost to shops equipped with milling machines, making it convenient and extremely economical for such shops to make or form their own milling machine cutters and have them handy and available whenever jobs requiring their use come in.

While I have described the invention along specific lines, various minor changes or refinements may be made without departing from its principle, and I desire to consider all such changes and refinements as coming within the scope and spirit of the appended claim.

I claim:

A tool holder comprising a support, a slide in one side of the same and longitudinally yieldable, the slide having a pocket in its outer side, a tool seated in said pocket and having a number of longitudinally-spaced slots, and screws directed into the slide by way of the slots, the heads of the screws bearing against the outer face of the tool to clamp the same to the slide when the tool is longitudinally adjusted within the limits of the slots.

HERMAN C. VIZENTS.